(12) United States Patent
McIntosh et al.

(10) Patent No.: US 8,638,296 B1
(45) Date of Patent: Jan. 28, 2014

(54) METHOD AND MACHINE FOR NAVIGATION SYSTEM CALIBRATION

(76) Inventors: Jason McIntosh, Sugar Hill, GA (US); Marc Boillot, Plantation, FL (US)

( * ) Notice: Subject to any disclaimer, the term of this patent is extended or adjusted under 35 U.S.C. 154(b) by 412 days.

(21) Appl. No.: 13/111,092

(22) Filed: May 19, 2011

Related U.S. Application Data

(63) Continuation-in-part of application No. 11/850,634, filed on Sep. 5, 2007, now Pat. No. 7,961,173.

(60) Provisional application No. 60/842,436, filed on Sep. 5, 2006.

(51) Int. Cl.
*G06F 3/033* (2013.01)

(52) U.S. Cl.
USPC ................................ 345/158; 702/94; 606/53

(58) Field of Classification Search
USPC ............. 345/156–184; 702/94–95, 150–153; 361/679.01–679.29; 463/30–35; 606/53
See application file for complete search history.

(56) References Cited

U.S. PATENT DOCUMENTS

| | | | | |
|---|---|---|---|---|
| 5,280,457 | A | * | 1/1994 | Figueroa et al. ............... 367/127 |
| 5,517,990 | A | * | 5/1996 | Kalfas et al. ................... 600/414 |
| 6,090,114 | A | | 7/2000 | Matsuno et al. |
| 6,546,277 | B1 | | 4/2003 | Franck et al. |
| 7,139,418 | B2 | | 11/2006 | Abovitz et al. |
| 7,309,339 | B2 | | 12/2007 | Cusick |
| 7,392,076 | B2 | | 6/2008 | Moctezuma de La Barrera |
| 7,395,181 | B2 | | 7/2008 | Foxlin |
| 7,477,926 | B2 | | 1/2009 | McCombs |
| 7,559,931 | B2 | | 7/2009 | Stone |
| 7,604,645 | B2 | | 10/2009 | Barzell et al. |
| 7,636,595 | B2 | | 12/2009 | Marquart |
| 7,657,298 | B2 | | 2/2010 | Moctezuma de la Barrera et al. |
| 7,660,623 | B2 | | 2/2010 | Hunter et al. |
| 7,681,448 | B1 | | 3/2010 | Preston et al. |
| 7,685,861 | B2 | | 3/2010 | Lynch et al. |
| 7,689,032 | B2 | | 3/2010 | Strassenburg-Kleciak |
| 7,771,436 | B2 | | 8/2010 | Moctezuma et al. |
| 7,824,328 | B2 | | 11/2010 | Gattani et al. |
| 2001/0011175 | A1 | | 8/2001 | Hunter et al. |
| 2004/0024309 | A1 | | 2/2004 | Ferre et al. |
| 2004/0236424 | A1 | | 11/2004 | Berez et al. |
| 2004/0254584 | A1 | | 12/2004 | Sarin et al. |
| 2006/0235420 | A1 | | 10/2006 | Irving |
| 2007/0175489 | A1 | | 8/2007 | Moctezuma et al. |
| 2008/0269599 | A1 | | 10/2008 | Csavoy et al. |
| 2009/0318836 | A1 | | 12/2009 | Stone et al. |
| 2010/0063508 | A1 | | 3/2010 | Borja et al. |
| 2010/0069911 | A1 | | 3/2010 | Borja et al. |
| 2010/0076505 | A1 | | 3/2010 | Borja et al. |
| 2010/0137869 | A1 | | 6/2010 | Borja et al. |
| 2010/0160771 | A1 | | 6/2010 | Gielen et al. |
| 2010/0210939 | A1 | | 8/2010 | Hartmann et al. |

* cited by examiner

*Primary Examiner* — Liliana Cerullo

(57) ABSTRACT

A method of calibration and a calibration machine is provided for calibrating sensory controls of an ultrasonic navigation system. It can include an enclosure for containing a paired device group to minimize air flow therein, one or more holder mechanisms for rigidly mounting the paired devices at specific and adjustable orientations, and a rail system for holding the one or more holder mechanisms at specific locations within the enclosure. A computer communicatively coupled to the calibration machine can precisely adjust actuators for configuring the distances and orientations of the holding mechanisms and control a transmission and reception of the paired devices for calibrating the paired devices.

20 Claims, 6 Drawing Sheets

METHOD AND MACHINE FOR NAVIGATION SYSTEM CALIBRATION

CROSS-REFERENCE TO RELATED APPLICATION

This application is a Continuation-In-Part of U.S. patent application Ser. No. 11/850,634 filed on Sep. 5, 2007 claiming the priority benefit of U.S. Provisional Patent Application No. 60/842,436 filed on Sep. 5, 2006, the entire contents of which are hereby incorporated by reference.

BACKGROUND

1. Field

The present embodiments of the invention generally relate to the field of user interfaces, and more particularly to input pointing devices.

2. Introduction

Navigation systems and other sensing technologies are generally coupled to a display. Interaction with the display can occur via mouse, keyboard or touch screen. There are cases however when the display or its peripheral devices are not directly accessible and a touchless interaction is preferable.

DETAILED DESCRIPTION

Figure 1A:
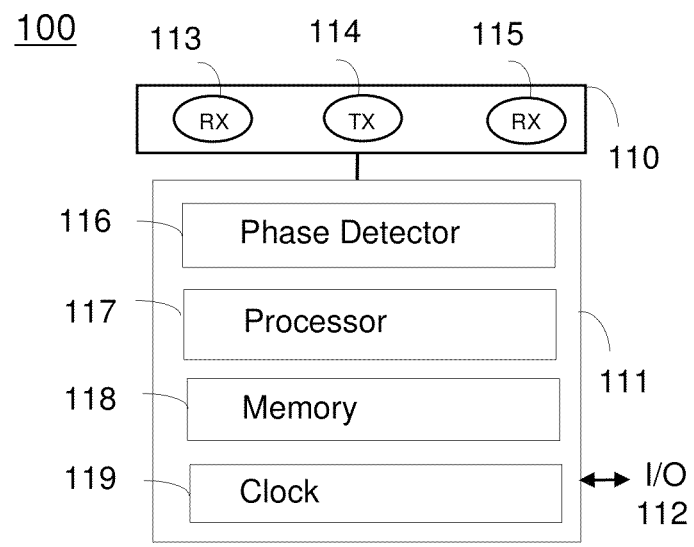
FIG. 1A illustrates a sensing device in accordance with one embodiment.

While the specification concludes with claims defining the features of the invention that are regarded as novel, it is believed that the invention will be better understood from a consideration of the following description in conjunction with the drawing figures, in which like reference numerals are carried forward.

Broadly stated, a method and apparatus is disclosed for navigated calibration and providing sensitivity information within the context of a surgical user interface. The navigation system herein permits ultrasonic user interface control via one or more wand pointing devices and a receiver device. The wand is used to identify points of interest in three-dimensional space via a wand tip. The calibration permits precise tracking and location sensing. The wand tip does not require any electronics or sensors and permits pinpoint access. The wand can also be affixed to an object to track its movement and orientation within proximity of the receiver. The sensory feedback can include a visual indication of the wand's location and orientation through the user interface.

Referring to FIG. 1A, an ultrasonic device 100 is shown. The ultrasonic device 100 includes a sensing unit 110 for creating an ultrasonic sensing space, and a controller 111 for operating the sensing unit 110. The ultrasonic device 100 detects movement and location of an object in the ultrasonic sensing space. A display can be coupled through I/O 112 to the ultrasonic device 100 for showing the movement or position of the object. The sensing unit 110 can include one or more transmitter 114 sensors and one or more receiver 115-116 sensors. One example of an ultrasonic device in such embodiment is disclosed and derived from parent application U.S. patent application Ser. No. 11/562,413 entitled "Method and System for Providing Sensory Feedback" filed Nov. 21, 2006 the entire contents of which are hereby incorporated by reference.

As one example, the sensing element can be ultrasonic for transmitting and receiving ultrasonic signals. The sensors can be an array (e.g., line, rows, cols, etc.) or other arranged pattern (e.g., cross, triangle, circle, etc.) of sensing elements. In another arrangement, the sensing element can be an array of microphones and speakers for transmitting and receiving ultrasonic and audio signals. In one arrangement, the ultrasonic device 100 can employ pulse-echo detection of reflected ultrasonic signals for determining its orientation with respect to an object within its proximity and for touchless sensing.

The ultrasonic device 100 can include, but is not limited to, a phase detector 116, a processor 117, a memory 118, and a clock 119. The sensing unit 110 can be integrated within the ultrasonic device 100, or apart from it. The phase detector 116 can be cooperatively connected to the sensing unit 110 for processing transmitted and received ultrasonic signals. The phase detector 116 can be coupled to the processor 117 for calculating phase differences among multiple receive signals. The processor 117 can process these phase differences for estimating a movement the object in the sensing space 101.

Figure 1B:
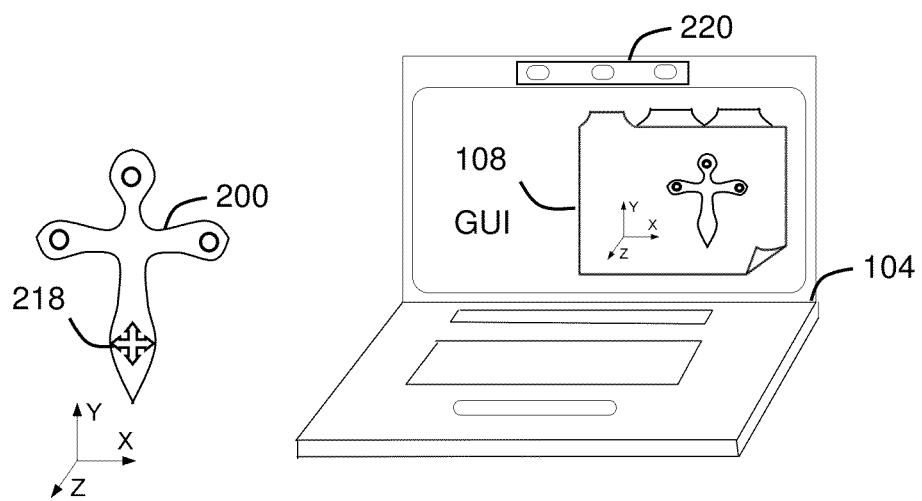
FIG. 1B illustrates a reconfiguration of the sensing device coupled to a host display in accordance with one embodiment.

In one arrangement, as shown in FIG. 1B the ultrasonic device 100 can be partitioned out to an ultrasonic wand 200 and an ultrasonic receiver 220 to separate the transmit 114 operations from the receive 115 operation. The wand 200 and receiver 220 together create a three-dimensional sensory space. In this configuration, a navigation system is provided for positional measurement via ultrasonic tracking between wand and receiver. One example of creating a three-dimensional sensory space and tracking object motion via ultrasonic sensing as applicable to the wand 200 and receiver 200 configuration is disclosed and derived from U.S. patent application Ser. No. 11/566,148 entitled "Method and System for Mapping Virtual Coordinates" filed Dec. 1, 2006 the entire contents of which are hereby incorporated by reference. The receiver 220 can precisely track the wand 200, or wands if more than one is present, and report the wand position on the graphical user interface (GUI) 108 of the laptop (host system) 104. The wand 200 provides additional user interface control via a soft key 218. The receiver 220 is integrated within a laptop display for portability as the illustration shows, although, the receiver 220 can be a self-powered standalone device to communicate with the laptop 104 via wireless communication.

An exemplary method for providing sensitivity and calibration information of the navigation system 100 is provided according to one embodiment. The method may contain more than the steps disclosed below and is not limited to the steps shown. At a first step, the receiver 220 analyzes a location and movement of the wand in the three-dimensional sensory space. As one example, a calibration machine can hold the wand 200 at a known location and orientation with respect to a paired device to register points. The calibration machine can adjust the location to simulate wand movement. This includes capturing and analyzing entire ultrasonic sound waves (up to 500 ms per transmit/receiver transducer pair) while the wand is still or in motion. It tracks a precise location of the wand 200 tip (and other transducers) thereon. The location is a point, for example, an <x,y,z> coordinate of the wand tip (and/or one of the transmitters or microphones). The movement or collection of static points over time describes a time trajectory of points and includes the wand's orientation and position. The orientation describes the tilt or twist. The position is relative to the receiver 220. The user can press the button 218 to register a point(s) of interest, for example, holding the button 218 down when registering a location of a point, or tracing the contour of the object (points creating a curve or line). Alternatively, a computer can automatically control when points are registered, and more specifically, the timing and synchronization of transmitted and captured ultrasonic waves.

At a second step, the receiver 220 provides sensitivity information (and/or sensory feedback) according to the wand's location (and movement). The wand 200 and receiver 220 directly communicate with one another via a wired or wireless connection. The receiver 220 communicates via a wireless connection to the laptop 104 which can include the display. The laptop 104 can be a computer, mobile device or a cell phone or combination thereof; it is not limited to these. The laptop 104 hosts the Graphical User Interface (GUI) 108. It can be a local application resident on the laptop 104, an on-line application provided by an Internet Service Provider or cloud computing system, a cable or internet-TV provider, or a down-loadable application over the air (e.g., cellular infrastructure, telecom, etc.). The sensory feedback can be visual feedback through the GUI 108 or other visual mechanisms (e.g., LED), auditory feedback (e.g., sound), or haptic feedback (e.g., vibration). As an example, the GUI 108 presents a virtual environment that can include a virtual wand showing its location and orientation relative to the receiver 220. The GUI 108 can report the wand's location and any registered points of interest in a virtual environment on the display.

Figure 2:
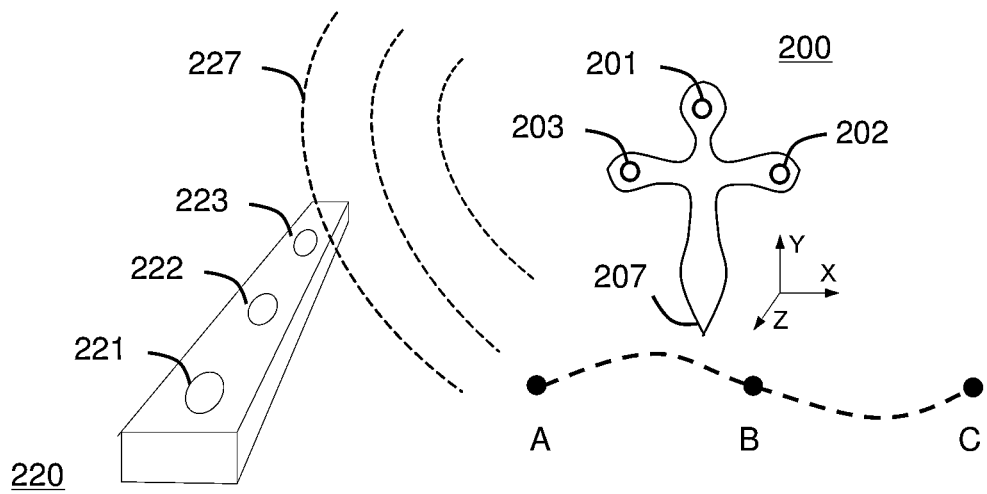
FIG. 2 illustrates a receiver and wand of the navigation system in accordance with one embodiment.

FIG. 2 shows one exemplary embodiment of the wand 200 and the receiver 220 for providing sensory feedback with associated modules and components. Not all the components shown are required; fewer components can be used depending on required functionality, for instance, whether the wand is used for isolated point registration, continuous wand tracking without user input or local illumination, or as integrated devices (e.g., laptop display). The wand 200 is a hand-held device with a size dimension of approximately 8-10 cm in width, 2 cm depth, and an extendable length from 10-12 cm. The receiver 220 has size dimensions of approximately 1-2 cm width, 1-2 cm depth, and a length of 4 cm to 6 cm. Neither device is however limited to these dimensions and can be altered to support various functions (e.g, hand-held, coupled to object). The current size permits ultrasonic tracking of the wand tip with millimeter spatial accuracy up to approximately 2 m in distance.

As indicated above, the wand 200 can register points of interest (see points A, B, C), for example, along a contour of an object or surface, which can be presented in a user interface (see laptop 104 FIG. 1). As will be discussed ahead, the wand 200 and receiver 220 can communicate via ultrasonic, infrared and electromagnetic sensing to determine their relative location and orientation to one another. Other embodiments incorporating accelerometers provide further positional information as will be discussed ahead.

The wand 200 includes sensors 201-203 and a wand tip 207. The sensors can be ultrasonic transducers, Micro Electro Mechanical Element (MEMS) microphones, electromagnets, optical elements (e.g., infrared, laser), metallic objects or other transducers for converting or conveying a physical movement to an electric signal such as a voltage or current. They may be active elements in that they are self powered to transmit signals, or passive elements in that they are reflective or exhibit detectable magnetic properties.

In a preferred embodiment, the wand 200 comprises three ultrasonic transmitters 201-203 for each transmitting ultrasonic signals through the air, an electronic circuit (or controller) 214 for generating driver signals to the three ultrasonic transmitters 201-203 for generating the ultrasonic signals, an user interface 218 (e.g., button) that receives user input for performing short range positional measurement and alignment determination, a communications port 216 for relaying the user input and receiving timing information to control the electronic circuit 214, and a battery 215 for powering the electronic circuit 215 and associated electronics on the wand 200. The wand 200 may contain more or less than the number of components shown; certain component functionalities may be shared as integrated devices.

Additional transmitter sensors can be included to provide an over-determined system for three-dimensional sensing. As one example, each ultrasonic transducer can perform separate transmit and receive functions. One such example of an ultrasonic sensor is disclosed and derived from U.S. patent application Ser. No. 11/562,410 filed Nov. 13, 2006 the entire contents of which are hereby incorporated by reference. The ultrasonic sensors can transmit pulse shaped waveforms in accordance with physical characteristics of a customized transducer for constructing and shaping waveforms.

The wand tip 207 identifies points of interest on a structure, for example, an assembly, object, instrument or jig in three-dimensional space but is not limited to these. The tip does not require sensors since its spatial location in three-dimensional space is established by the three ultrasonic transmitters 201-203 arranged at the cross ends. However, a sensor element can be integrated on the tip 207 to provide ultrasound capabilities (e.g., structure boundaries, depth, etc.) or contact based sensing. In such case, the tip 207 can be touch sensitive to registers points responsive to a physical action, for example, touching the tip to an anatomical or structural location. The tip can comprise a mechanical or actuated spring assembly for such purpose. In another arrangement it includes a capacitive touch tip or electrostatic assembly for registering touch. The wand tip 207 can include interchangeable, detachable or multi-headed stylus tips for permitting the wand tip to identify anatomical features while the transmitters 201-203 remain in line-of-sight with the receiver 220 (see FIG. 1). These stylus tips may be right angled, curved, or otherwise contoured in fashion of a pick to point to difficult to touch locations. This permits the wand to be held in the hand to identify via the tip 207, points of interest such as (anatomical) features on the structure, bone or jig. One such example of an ultrasonic navigation system is disclosed and derived from U.S. patent application Ser. No. 12/764,072 filed Apr. 20, 2010 the entire contents of which are hereby incorporated by reference.

The user interface 218 can include one or more buttons to permit handheld operation and use (e.g., on/off/reset button) and illumination elements to provide visual feedback. In one arrangement, a 5-state navigation press button 209 can communicate directives to further control or complement the user interface. It can be ergonomically located on a side of the wand to permit single handed use. The wand 200 may further include a haptic module with the user interface 218. As an example, the haptic module may change (increase/decrease) vibration to signal improper or proper operation. The wand 200 includes material coverings for the transmitters 201-202 that are transparent to sound (e.g., ultrasound) and light (e.g., infrared) yet impervious to biological material such as water, blood or tissue. In one arrangement, a clear plastic membrane (or mesh) is stretched taught; it can vibrate under resonance with a transmitted frequency. The battery 215 can be charged via wireless energy charging (e.g., magnetic induction coils and super capacitors).

The wand 200 can include a base attachment mechanism 205 for coupling to a structure, object or a jig. As one example, the mechanism can be a magnetic assembly with a fixed insert (e.g., square post head) to permit temporary detachment. As another example, it can be a magnetic ball and joint socket with latched increments. As yet another example, it can be a screw post o pin to an screw. Other embodiments may permit sliding, translation, rotation, angling and lock-in attachment and release, and coupling to standard jigs by way of existing notches, ridges or holes.

The wand 200 can further include an amplifier 213 and the accelerometer 217. The amplifier enhances the signal to noise ratio of transmitted or received signals. The accelerometer 217 identifies 3 and 6 axis tilt during motion and while stationary. The communications module 216 may include components (e.g., synchronous clocks, radio frequency 'RF' pulses, infrared 'IR' pulses, optical/acoustic pulse) for signaling to the receiver 220 (FIG. 2B). The controller 214, can include a counter, a clock, or other analog or digital logic for controlling transmit and receive synchronization and sequencing of the sensor signals, accelerometer information, and other component data or status. The battery 215 powers the respective circuit logic and components. The infrared transmitter 209 pulses an infrared timing signal that can be synchronized with the transmitting of the ultrasonic signals (to the receiver).

The controller 214 can utilize computing technologies such as a microprocessor (uP) and/or digital signal processor (DSP) with associated storage memory 108 such a Flash, ROM, RAM, SRAM, DRAM or other like technologies for controlling operations of the aforementioned components of the device. The instructions may also reside, completely or at least partially, within other memory, and/or a processor during execution thereof by another processor or computer system. An Input/Output port permits portable exchange of information or data for example by way of Universal Serial Bus (USB). The electronic circuitry of the controller can comprise one or more Application Specific Integrated Circuit (ASIC) chips or Field Programmable Gate Arrays (FPGAs), for example, specific to a core signal processing algorithm. The controller can be an embedded platform running one or more modules of an operating system (OS). In one arrangement, the storage memory may store one or more sets of instructions (e.g., software) embodying any one or more of the methodologies or functions described herein.

The receiver 220 comprises a processor 233 for generating timing information, registering a pointing location of the wand 200 responsive to the user input, and determining short range positional measurement and alignment from three or more pointing locations of the wand 200 with respect to the receiver 220. It includes a communications interface 235 for transmitting the timing information to the wand 200 that in response transmits the first, second and third ultrasonic signals. The ultrasonic signals can be pulse shaped signals generated from a combination of amplitude modulation, frequency modulation, and phase modulation. Three microphones 221-223 each receive the first, second and third pulse shaped signals transmitted through the air. The receiver 220 shape can be configured from lineal as shown, or in more compact arrangements, such as a triangle shape. One example of a device for three-dimensional sensing is disclosed in U.S. patent application Ser. No. 11/683,410 entitled "Method and Device for Three-Dimensional Sensing" filed Mar. 7, 2007 the entire contents of which are hereby incorporated by reference. The memory 238 stores the first, second and third ultrasonics signals and can produce a history of ultrasonic signals or processed signals. It can also store wand tip positions, for example, responsive to a user pressing the button to register a location. The wireless communication interface (Input/Output) 239 wirelessly conveys the positional information and the short range alignment of the three or more pointing locations to a remote system. The remote system can be a computer, laptop or mobile device that displays the positional information and alignment information in real-time as described ahead. The battery powers the processor 233 and associated electronics on the receiver 220. The receiver 200 may contain more or less than the number of components shown; certain component functionalities may be shared or therein integrated.

Additional ultrasonic sensors can be included to provide an over-determined system for three-dimensional sensing. The ultrasonic sensors can be MEMS microphones, receivers, ultrasonic transmitters or combination thereof. As one example, each ultrasonic transducer can perform separate transmit and receive functions. One such example of an ultrasonic sensor is disclosed in U.S. patent application Ser. No. 11/562,410 filed Nov. 13, 2006 the entire contents of which are hereby incorporated by reference. The receiver 220 can also include an attachment mechanism 240 for coupling to bone or a jig. As one example, the mechanism 240 can be a magnetic assembly with a fixed insert (e.g., square post head) to permit temporary detachment. As another example, it can be a magnetic ball and joint socket with latched increments.

The receiver 220 can further include an amplifier 232, the communications module 235, an accelerometer, and processor 233. The processor 233 can host software program modules such as a pulse shaper, a phase detector, a signal compressor, and other digital signal processor code utilities and packages. The amplifier 232 enhances the signal to noise of transmitted or received signals. The processor 233 can include a controller, counter, a clock, and other analog or digital logic for controlling transmit and receive synchronization and sequencing of the sensor signals, accelerometer information, and other component data or status. The accelerometer 236 identifies axial tilt (e.g., 3/6 axis) during motion and while stationary. The battery 234 powers the respective circuit logic and components. The receiver includes a photo diode 241 for detecting the infrared signal and establishing a transmit time of the ultrasonic signals to permit wireless infrared communication with the wand.

The communications module 235 can include components (e.g., synchronous clocks, radio frequency 'RF' pulses, infrared 'IR' pulses, optical/acoustic pulse) for local signaling (to wand 102). It can also include network and data components (e.g., Bluetooth, ZigBee, Wi-Fi, GPSK, FSK, USB, RS232, IR, etc.) for wireless communications with a remote device (e.g., laptop, computer, etc.). Although external communication via the network and data components is herein contemplate, it should be noted that the receiver 220 can include a user interface 237 to permit standalone operation. As one example, it can include 3 LED lights 224 to show three or more wand tip pointing location alignment status. The user interface 237 may also include a touch screen or other interface display with its own GUI for reporting positional information and alignment.

The processor 233 can utilize computing technologies such as a microprocessor (uP) and/or digital signal processor (DSP) with associated storage memory 108 such a Flash, ROM, RAM, SRAM, DRAM or other like technologies for controlling operations of the aforementioned components of the terminal device. The instructions may also reside, completely or at least partially, within other memory, and/or a processor during execution thereof by another processor or computer system. An Input/Output port permits portable exchange of information or data for example by way of Universal Serial Bus (USB). The electronic circuitry of the controller can comprise one or more Application Specific Integrated Circuit (ASIC) chips or Field Programmable Gate Arrays (FPGAs), for example, specific to a core signal processing algorithm or control logic. The processor can be an embedded platform running one or more modules of an operating system (OS). In one arrangement, the storage memory 238 may store one or more sets of instructions (e.g., software) embodying any one or more of the methodologies or functions described herein.

One exemplary method for determining wand position via ultrasonic sensing and providing sensory feedback therewith is disclosed in U.S. patent application Ser. No. 12/900,662 filed Oct. 8, 2010 the entire contents of which are hereby incorporated by reference.

In a first arrangement, the receiver 220 is wired via a tethered electrical connection (e.g., wire) to the wand 200. That is, the communications port of the wand 200 is physically wired to the communications interface of the receiver 220 for receiving timing information. The timing information from the receiver 220 tells the wand 200 when to transmit and includes optional parameters that can be applied to pulse shaping. The processor on the receiver 220 employs this timing information to establish Time of Flight measurements in the case of ultrasonic signaling with respect to a reference time base.

In a second arrangement, the receiver 220 is communicatively coupled to the wand 200 via a wireless signaling connection. An infrared transmitter 209 on the wand 200 transmits an infrared timing signal with each transmitted pulse shaped signal. It pulses an infrared timing signal that is synchronized with the transmitting of the ultrasonic signals to the receiver. The receiver 302 can include a photo diode 241 for determining when the infrared timing signal is received. In this case the communications port of the wand 200 is wirelessly coupled to the communications interface of the receiver 220 by way of the infrared transmitter and the photo diode for relaying the timing information to within microsecond accuracy (~1 mm resolution). The processor on the receiver 220 employs this infrared timing information to establish the first, second and third Time of Flight measurements with respect to a reference transmit time.

Figure 3A:
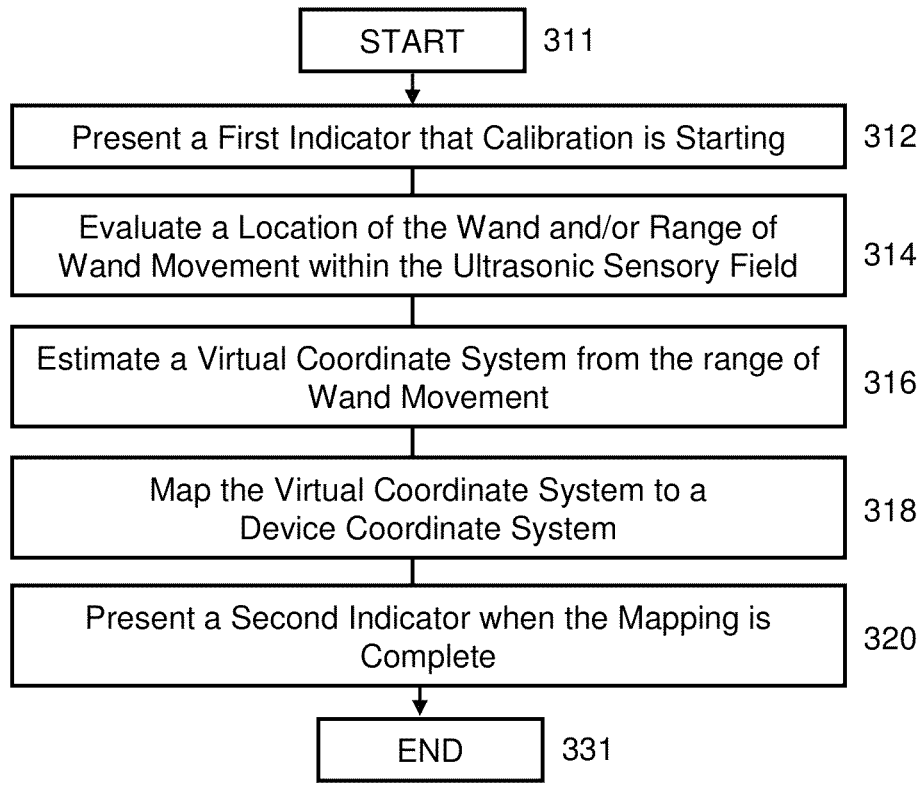
FIG. 3A illustrates a method for navigated calibration in accordance with one embodiment.

Referring to FIG. 3A, a method 310 for calibrating sensory controls of a surgical navigation system is shown. In general, the method can include tracking a first range of a wand movement corresponding to a left-right track within a virtual coordinate system of a ultrasonic sensory field with respect to a stationary origin of the navigation system during the first range; aligning the first range corresponding to a left-right wand track with a X principal axis of the virtual coordinate system; tracking a second range of wand movement within the virtual coordinate system of the ultrasonic sensory field with respect to the stationary origin of the navigation system during the second range; aligning the second range of an up-down wand track with a Y principal axis of the virtual coordinate system; and mapping both the X principal and Y principal axes of the virtual coordinate system to principal axes of a display coordinate system communicatively coupled to the navigation system.

The range calibration can establish the wand's display orientation with respect to the stationary origin of the navigation system and map the range of motion along the principal axes to the display. One or more range calibrations of differing wand orientations at differing origin locations permit respective alignment of the same X and Y principal axes with the display coordinate system to support different user interface control mappings. The first range and the second range of wand movement can be orthogonal and span a full linear range up to 2 meters thereby supporting alignment, position, and trajectory measurements, instruments and equipment. In another configuration, the first range and the second range of wand movement can be along a radial range spanning 120 degrees. The first range and the second range of wand movement can be bounded to a predetermined signal to noise ratio, for example, as determined from modeled transmitter characteristics in a controlled environment by way of a calibration machine.

The method 310 can be practiced with more or less than the number of steps shown. To describe the method 310, reference will be made to FIGS. 1-2 although it is understood that the method 310 can be implemented in any other suitable device or system using other suitable components. Moreover, the method 310 is not limited to the order in which the steps are listed in the method 310 In addition, the method 310 can contain a greater or a fewer number of steps than those shown in FIG. 3A.

At step 311, the method can begin. As an example, the method can begin when a button is held down for predetermined duration. It should be noted, the method 310 is not dependent on a button press for initiating calibration and can start for various other reasons. At step 312, a first indicator can be presented that calibration is started. For example, upon entering calibration mode, a display can be presented to inform the user that a calibration mode has been entered. Alternatively, a sound can be audibly played or a visual element can be lighted to inform the user. It should be noted that step 312 is an optional step and not required for calibration.

At step 314, a location of the wand and/or a range of wand movement within the ultrasonic sensory field can be evaluated. Evaluating the range of wand movement informs the ultrasonic sensing unit 110 (See FIG. 1) of the bounds for associating wand movement with a control range. Alternatively, the location of the Wand 200 with respect to the Receiver 220 can be recorded for calibration if the paired devices are stationary. In the latter, as will be seen ahead, the calibration can be performed with the wand 200 and receiver 220 at stationary locations in a calibration box and at known orientations relative to one another. In such a calibration setting, the wand's range of motion can be simulated therefrom.

At step 316, a virtual coordinate system can be estimated from the range of wand movement. The virtual coordinate system is associated with a physical coordinate system of the wand movement or an anatomical coordinate system. Notably, the bounds of the virtual coordinate system are determined from the range of wand movement. One example of an ultrasonic surgical navigation system for registering anatomical points and creating local (bone) coordinate systems (e.g., femur, tibia) is disclosed in Ser. No. 12/764,078 filed Apr. 20, 2010 the entire contents of which are incorporated by reference herein. Returning to the method 310, at step 318, the virtual coordinate system is mapped to a device coordinate system. Briefly referring to FIG. 3B-3C, the device coordinate system 320 may be the display coordinate system 361.

As will be seen ahead, the steps of tracking can be automated by a calibration machine configured to precisely adjust the wand orientation along a left-right track, along the up-down track, or a forward-backward track, where the latter two may interchangeably refer to vertical or depth. The steps of aligning the first and second range and can be performed by the calibration machine that initially maps the X principal and Y principal axes of the virtual coordinate system to a paired device group coordinate system comprising one or more wands and a receiver board.

The method of 310 can further include presenting a first visual indicator that calibration is starting; evaluating the first and second full range of wand movement within the ultrasonic sensory field; mapping the full range of wand movements to a display range of the display coordinate system; and presenting a second visual indicator when the mapping is complete. The mapping can map at least two locations of the wand along each of three orthogonal principal axes in the ultrasonic sensory field to corresponding principal axes of the display range to assign a virtual coordinate system to the ultrasonic sensory field.

The step of mapping the range further can include estimating an elliptical or approximately spherical trajectory of the virtual coordinate system from a full rotational range of wand movement; determining and visually presenting an origin of the virtual coordinate system by finding the stationary origin of the elliptical or approximately spherical trajectory; identifying the stationary origin of the wand in the virtual coordinate system from a center of the circumferential boundary; determining a difference between the stationary origin of the wand in the virtual coordinate system and a display origin in the display coordinate system; and mapping the virtual coordinate system to the display coordinate system based on the difference. The mapping can include translating the circumferential boundary of the elliptical or spherical trajectory to a projection through an affine transformation; and non-linearly mapping the projection onto a rectangular area of the display. The mapping can account for the movement of the wand along the first and second full range of wand movement along the principal axes of the virtual coordinate system with respect to a principal axes of the display coordinate system.

Figures 3B, 3C:
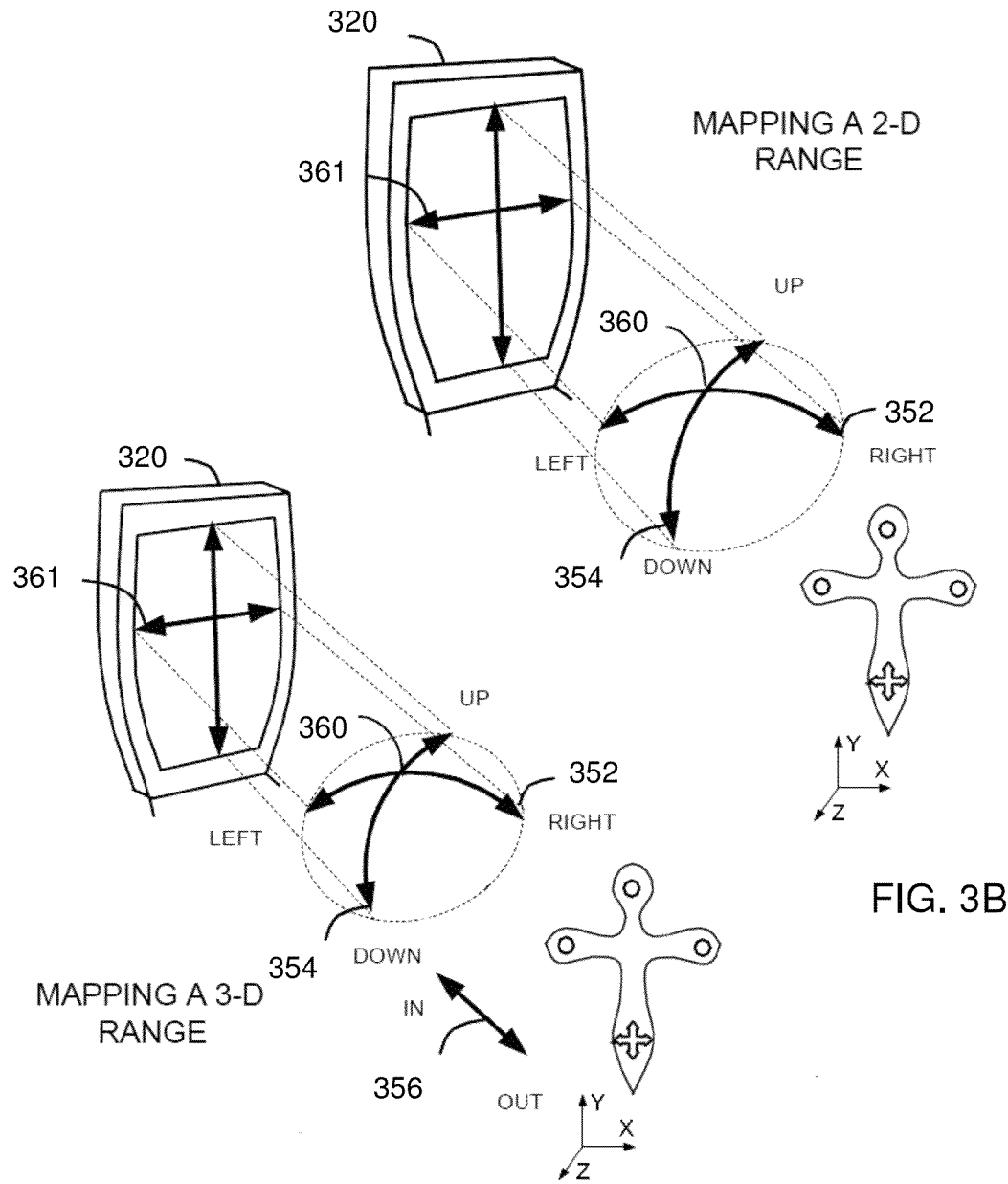
FIG. 3B illustrates a two-dimensional mapping in accordance with example embodiment.
FIG. 3C illustrates a three-dimensional mapping in accordance with one embodiment.

FIG. 3B shows a two-dimensional virtual coordinate system 360 and device coordinate system 361. In general, a method for calibrating sensory controls of a navigation system for positional measurement is provided that performs the steps of aligning a first range corresponding to a left-right wand track with a X principal axis of a paired device coordinate system; aligning a second range of an up-down wand track with a Y principal axis of the paired device coordinate system; and aligning a second range of an forward-backward wand track with a Z principal axis of the paired device coordinate system. The calibration machine can orient a paired device group comprising a wand and a receiver board to be line of sight and along a normal face through a positional analysis of transmit and receive characteristics of ultrasound waves. The calibration machine can include a computer communicatively coupled to the paired device group for controlling a transmission of ultrasonic waves from a wand of the paired device and for recording captured ultrasonic waves received at a receiver board of the paired device. In one embodiment, the calibration can be performed on a calibration machine having distances and positions for the paired devices corresponding to line of sight conditions expected during routine use.

For example, a left-right wand movement corresponds to an X axis on the virtual coordinate system 360 and the device coordinate system 361. The up-down wand movement corresponds to a Y axis on the virtual coordinate system and the device coordinate system 361. A rotational movement corresponds to the boundary of the virtual coordinate system 361.

FIG. 3C shows a three-dimensional virtual coordinate system 360 and device coordinate system 361 is shown. As one example, a back-forth wand movement corresponds to a Z axis on the virtual coordinate system 360 and the device coordinate system 361. A rotational movement corresponds to the boundary of the virtual coordinate system 361. Mapping the virtual coordinate system 360 to the device coordinate system 320 can be considered analogous to mapping a full tracking range of wand movement to the display. That is, each location of the wand in the ultrasonic sensory space 227 can be associated with a location on the display 320. At step 320, a second indicator can be presented when the mapping is complete. Notably, step 320 is optional to the calibration and is useful for informing the user of the calibration status. At step 231, the method can end.

Figure 4A:
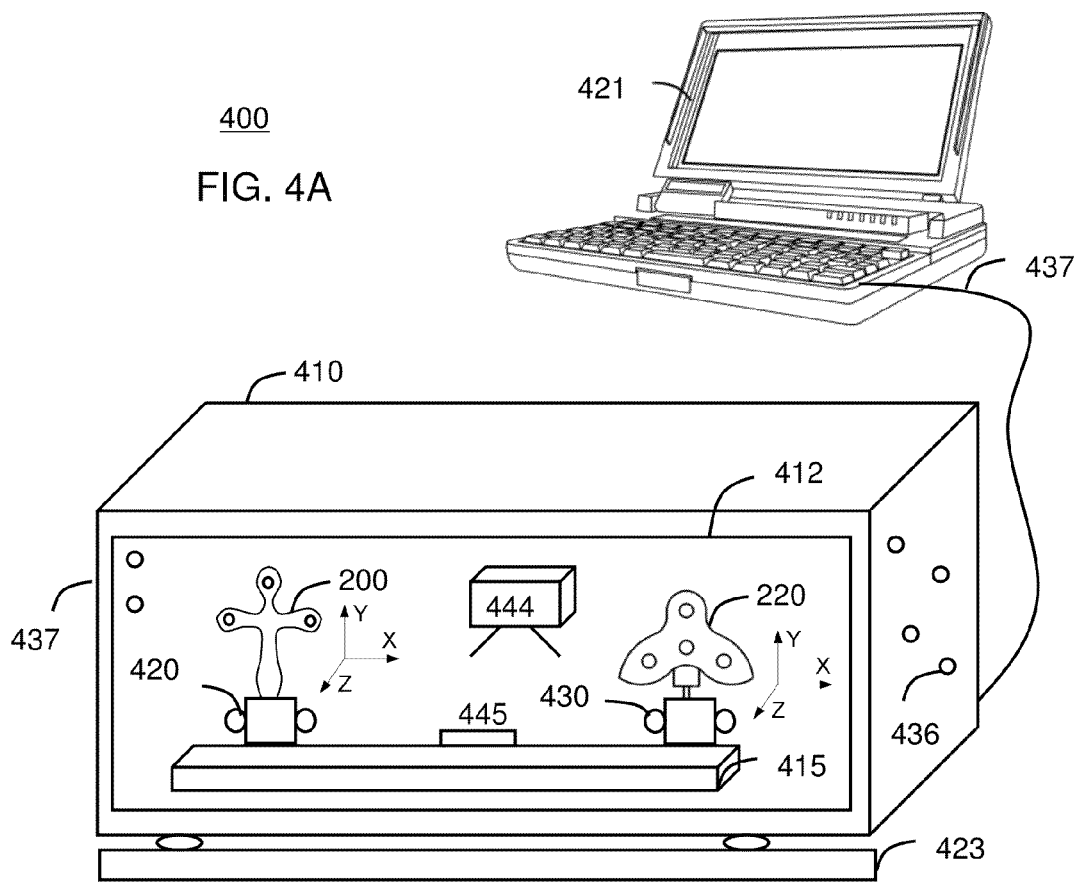
FIG. 4A illustrates a calibration machine in accordance with one embodiment.

FIG. 4A shows a calibration machine 400 according to one embodiment for precisely calibrating paired devices. A calibration machine 400 for calibrating sensory controls of an ultrasonic navigation system is provided and can include an enclosure for containing a paired device group that minimizes air flow therein; one or more holder mechanisms for rigidly mounting each device of the paired device group at a specific orientation; and a rail system for holding the one or more holder mechanisms at a specific location within the enclosure. It can include a computer communicatively coupled to the paired device group for controlling a transmission of ultrasonic waves from a wand of the paired device and for recording captured ultrasonic waves received at a receiver board of the paired device. In one configuration, the rail system places the one or more holder mechanisms for two or more paired devices along individual line of sights and do not interfere with one another. In one embodiment, the paired devices are used to measure local orientation relative to one another or objects attached thereto. The paired devices can support the installation of mechanical components by measurement of alignment, position, and trajectory in relation to a mechanical axis.

Briefly, the calibration machine 400 precisely calibrates transducer characteristics of paired devices under controlled environmental settings at controlled locations and orientations. The paired devices are placed on a rail system 415 in the sealed chamber with sound dampening material 412 to absorb sound and minimize air flow movement. The sealed chamber of the calibration machine 400 can be a rectangular box or similar make with walled sides that open for permitting rapid placement of the paired devices in a manufacturing setting.

As an example, a front panel 421 can open and then close to accept placement of the paired devices on the rail system 415 or other insert contraption. Alternatively, the bottom may be open, and a machine can lift and place the calibration box over the paired devices on the rail system 415. Other fast manufacturing placements are herein contemplated and not limited to those disclosed. The rail system 415 allows for adjusting the location and position of the holding mechanisms 420 and 430 (one for each paired device). Each holding mechanism 420/430 can be precisely oriented in <X,Y,Z> directions as illustrated, either manually through turn knobs or via a software programmable actuator controlled through a wired 437 or wireless link via the calibration computer 421.

The calibration computer 423 hosts a software program to automatically adjust the holding mechanisms 420 and 430 to orient the paired devices in a predetermined configuration (or through a range of motion), for example, with respect to a normal of a face of a surface of either the wand or receiver board, where the face may be defined as the surface of three or more transmitters or three or more receivers forming a plane. The software program can also control the pulsing and timing of transmitted ultrasonic signals, and establish capture and record time windows. For instance, the software program can direct the wand 200 to synchronize or stagger a transmit of an ultrasonic waveform from any of the transmitter elements thereon, and then proceed to record the received waveforms at the microphones of the receiver board 220. The software algorithms also calibrate transmitter characteristics as an approximate linear function of distance between transmitter and receiver pairs. It applies a two-dimensional weighting (numeric scaling) to the transducer radiation pattern of three-dimensions. A three-dimensional weighting can also be applied to account for temperature variation. The range scales from approximately 0.3 mm spatial resolution within 10 cm range to approximately 1 mm spatial resolution at 1 meter range. The holding mechanisms 420 and 430 can positionally move across the rail system 415 and further angle the held device (e.g., wand 200 or receiver board 220) to a particular orientation. The software program on the computer 421 can include custom drivers to precisely adjust the actuators of the holding mechanisms for setting a desired distance and orientation. A Graphical User Interface (GUI) may also be exposed by the software program to simplify user input and interaction with the calibration machine 400 for performing these tasks. The software program can also store tuning parameters associated with the calibration to local or on-line files or servers. The software program may also communicate with external servers to validate license keys of the paired devices.

The calibration machine may include an air pump 444 with an adjustable air flow control to establish laminar air flow, wherein the enclosure may further include acoustic input ports 436 and acoustic output ports 437, and the air pump provides a constant volume velocity of air within the enclosure between the acoustic input ports and acoustic output ports. It may also include a temperature sensor 445 or thermocouple to monitor air temperature within the enclosure. The temperature sensor can be placed midway or approximately center of the paired devices (e.g, 200/220).

Figure 4B:
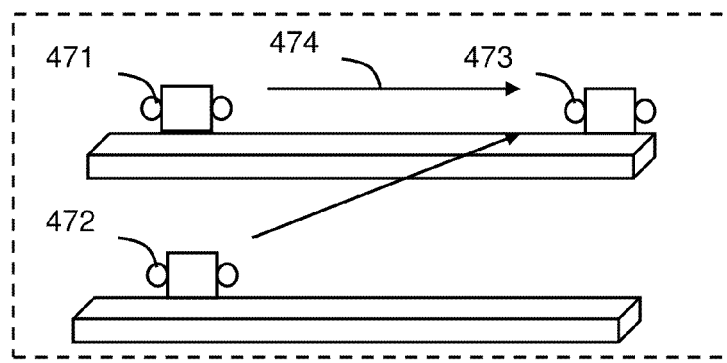
FIG. 4B illustrates a rail system in accordance with one embodiment.

FIG. 4B depicts a rail system 415 for guiding the holding mechanisms 420/430. The rail system 415 can place the one or more holder mechanisms for two or more paired devices (471-473) along individual line of sights 474 and do not interfere with one another. The holder mechanisms 471-473 may provide an actuator for precise sub millimeter precision along six degrees of rotation for orienting a respective device of a paired device group. The rail system 415 permits the calibration machine to orient a paired device group comprising a wand and a receiver board to be line of sight and along a normal face through a positional analysis of transmit and receive characteristics of ultrasound waves.

The calibration performed by the calibration machine 400 can be considered a first level calibration that can be performed prior to the secondary calibration of the wand range of motion noted above in the discussion of FIGS. 3B and 3C. The secondary calibration can account for the signal to noise levels of paired devices and their orientations relative to one another based on sensitivity information captured from the first controlled calibration. The secondary calibration can identify and report range of motion parameters, for instance, when the paired devices are in line of sight, or angled out of view of one another (e.g., >120 degrees from a normal face, >2 m separation, etc.). The secondary calibration can also report whether one device is oriented properly with respect to another device. A paired device are one or more devices that communicate with one another and can be two wands and one receiver board, two receiver boards and one wand, or any other combination. The pairing may be via a wired or wireless connection; for example, the wand 200 may be wired to the receiver 220 via a multi lead wire or over an IR synchronized wireless coupling.

As shown in FIGS. 3B and 3C the wand may subject to a radial movement, for example, when attached to the end of the femur in the context of the surgical navigation system for assessing alignment as shown ahead in FIG. 4B. The calibration machine 400 permits for a precisely controlled range of motion, whether it be linear, along an arc, other trajectory, or even static in a still position. The acoustic and electronic design of the calibration machine 400 permits for a controlled evaluation of the sound propagation characteristics of the paired devices in an ideal setting; that is, it can be calibrated with known affect of air flow and temperature. The calibration machine 400 includes a condition control 750 for precisely controlling and reporting air flow (e.g. air pump, fan) and temperature (e.g., thermistor), information which is read from the calibration software in the computer 421 and incorporated in firmware and hardware in the devices themselves (e.g., receiver board 220).

Figure 5:
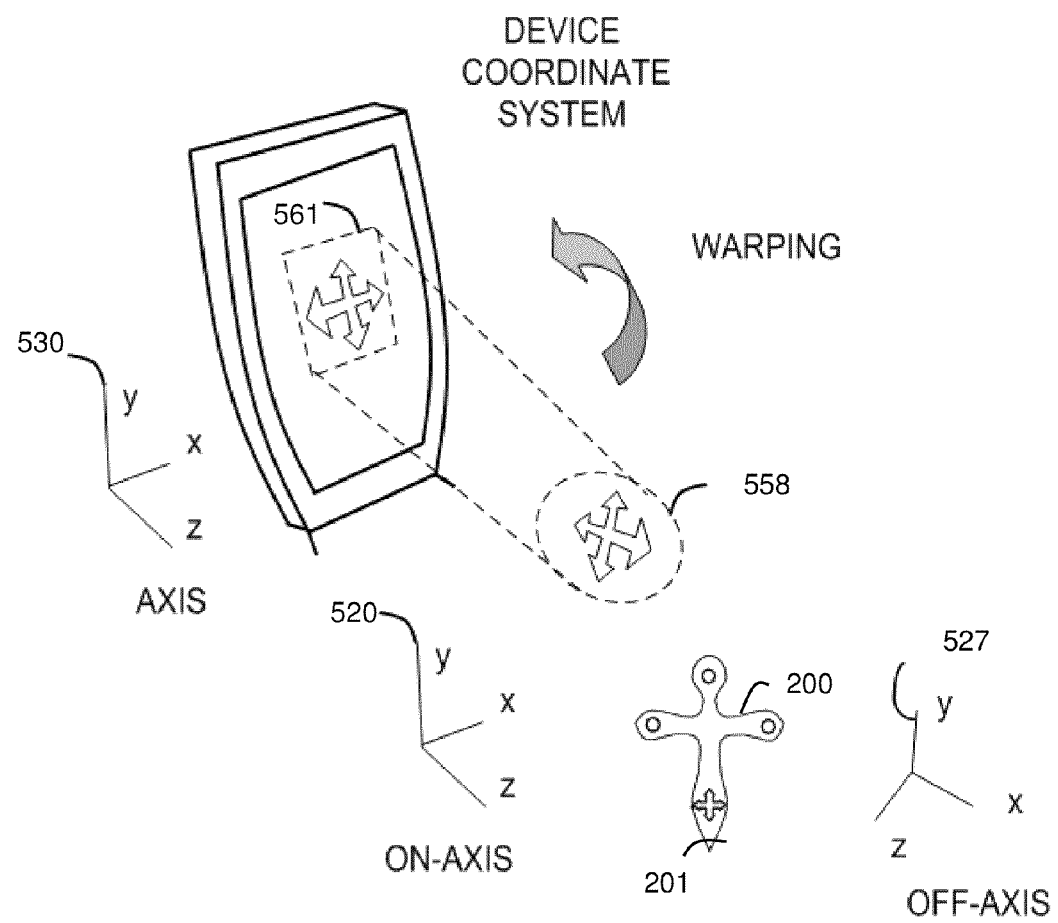
FIG. 5 is an illustration for warping a coordinate system in accordance with one embodiment.

Referring to FIG. 5, an illustration for warping the virtual coordinate system 520 to the device coordinate system 330 is shown. As illustrated, an elliptical area 568 can be translated to an elliptical projection. For example, the circumferential boundary 558 of wand movement can be translated through an affine transformation. The translation accounts for a difference in alignment between the virtual coordinate system 520 principal axes (X,Y,Z) and the device coordinate system 530 principal axes (X,Y,Z). For instance, if the wand is positioned radially towards the display, the principal axes of the virtual coordinate system 520 will align with the principal axes of the device coordinate system 630, and thus be on-axis. In this arrangement, no translation is necessary. However, if the position of the wand is such that a normal vector is not radially aligned with the display, the principal axes 527 will be off-axis with the principal axes of the virtual coordinate system 530. Accordingly, a translation is necessary to first align the principal axes of the virtual coordinate system 620 and device coordinate system 530 prior to mapping.

The elliptical projection can be mapped onto a rectangular area as shown in FIG. 5. Upon translation of the elliptical area 558 to an elliptical projection, the elliptical projection can be mapped to the rectangular area 561 which is associated with the display boundary of the mobile device. In practice, the desired range of wand movement is mapped to the entire display range such that the bounds of wand sensitivity (e.g., ultrasonic signal to noise level, phase distortion, etc.) in the virtual coordinate system correspond to the bounds of control in the device coordinate system. A visual indicator can be presented upon completion of the warping, which may coincide with completion of the mapping.

While the present invention has been described with reference to particular embodiments, those skilled in the art will recognize that many changes may be made thereto without departing from the spirit and scope of the present invention. Each of these embodiments and obvious variations thereof is contemplated as falling within the spirit and scope of the invention.

What is claimed is:

1. A calibration machine for calibrating sensory controls of an ultrasonic navigation system comprising a wand and a receiver for measuring one of alignment, position, and distance, the calibration machine comprising
    an enclosure for containing a paired device group that monitors air temperature and air flow therein;
    one or more holder mechanisms for rigidly mounting each the wand and receiver of the paired device group at a specific orientation;
    a rail system for holding the one or more holder mechanisms at a specific location and orientation within the enclosure; and
    a computer communicatively coupled to the one or more holder mechanisms for
        precisely orienting the paired device group in a predetermined configuration along the rail system;
        calibrating sensor characteristics of the wand and receiver as a function of distance and rotation between the wand and the receiver for the predetermined configuration; and
        storing tuning parameters associated with the calibrating of sensor characteristics to files recording precise calibration of transducer characteristics of the wand and receiver paired device group with respect to the air temperature and air flow.

2. The calibration machine of claim 1, wherein the rail system places the one or more holder mechanisms for two or more paired devices along individual line of sights and do not interfere with one another.

3. The calibration machine of claim 1, further comprising an air pump with an adjustable air flow control to establish laminar air flow, wherein the enclosure includes acoustic input ports and acoustic output ports, and the air pump provides a constant volume velocity of air within the enclosure between the acoustic input ports and acoustic output ports.

4. The calibration machine of claim 1, further comprising:
    a temperature sensor or thermocouple to monitor the air temperature within the enclosure; and
    a sound absorption material within an interior of the enclosure to minimize air flow and maintain temperature.

5. The calibration machine of claim 1, wherein the holder mechanisms provide an actuator for precise sub millimeter precision along six degrees of rotation for orienting a respective device of a paired device group.

6. The calibration machine of claim 1, wherein the computer performs the steps of:
    controlling a transmission of ultrasonic waves from the wand of the paired device group;
    recording captured ultrasonic waves received at the receiver of the paired device group;
    calculating phase differences among multiply received ultrasonic signals; and
    calibrating the sensor characteristics of the paired device group from positional analysis of transmit and receive characteristics of the phase differences.

7. The calibration machine of claim 6, wherein the computer applies a weighting to a three-dimensional transmitter sensitivity pattern that is approximately a linear function of distance between the wand and the receiver.

8. The calibration machine of claim 6 wherein the computer performs the control steps of:
    tracking a first range of wand movement corresponding to a first track within a virtual coordinate system with respect to the receiver during the first range;
    tracking a second range of wand movement corresponding to a second track within the virtual coordinate system with respect to the receiver during the second range;
    orienting a pairing of the wand and the receiver in a predetermined configuration along the first track and the second track during the calibrating;
    calculating phase differences in reported wand orientation and location with respect to the receiver between the virtual coordinate system and a device coordinate system for the predetermined configuration; and
    calibrating the sensor characteristics of the wand and receiver as a function of distance and rotation between the wand and the receiver from the phase differences.

9. The calibration machine of claim 8, wherein the first range and the second range of wand movement are orthogonal and each span a full linear range between 0 meters up to 2 meters.

10. The calibration machine of claim 8, wherein second range of wand movement is rotational up to a radial range spanning 120 degrees.

11. The calibration machine of claim 8, wherein the calibrating the sensor characteristics along the first range and the second range of wand movement are bounded to a predetermined signal to noise ratio and as a function of precisely controlled temperature and air flow in a controlled environment.

12. The calibration machine of claim 8, where the steps of tracking are automated to precisely adjust the wand orientation along the first track and along the second track.

13. The calibration machine of claim 8 maps a X principal and a Y principal axes of the virtual coordinate system to the paired device group coordinate system.

14. The calibration machine of claim 8 orients the paired device group comprising the wand and the receiver to be line of sight and along a normal face through a positional analysis of transmit and receive characteristics of ultrasound waves.

15. Amended A method for calibrating sensory controls of an ultrasonic navigation system comprising a wand and a receiver for measuring one of alignment, position, and distance by way of a calibration machine that performs the steps of:
    monitoring air temperature and air flow within an enclosure containing a paired device group;
    orienting and positioning the wand and receiver of the paired device group along a rail system within the enclosure, wherein the rail system includes one or more holder mechanisms for rigidly holding the wand and receiver at a specific location and orientation within the enclosure; and
    storing tuning parameters associated with the calibrating of sensor characteristics to files recording precise calibration of transducer characteristics of the wand and receiver paired device group with respect to the air temperature and air flow.

16. The method of claim 15, where the calibration machine comprises a computer communicatively coupled to the paired device group for controlling a transmission of ultrasonic waves from the wand of the paired device and for recording captured ultrasonic waves received at the receiver board of the paired device, and the computer performs one or more of the following steps:
    aligning a first range corresponding to a first wand track with a X principal axis of a paired device coordinate system;
    aligning a second range of an second wand track with a Y principal axis of the paired device coordinate system; and aligning a second range of a third wand track with a Z principal axis of the device coordinate system.

17. The method of claim 15 for calibrating sensory controls of a navigation system, further comprising:
- tracking a first range of a wand movement corresponding to a first track within a virtual coordinate system of an ultrasonic sensory field with respect to a stationary origin of a receiver of the navigation system during the first range;
- aligning the first range corresponding to the wand first track with an X principal axis of the device coordinate system;
- tracking a second range of wand movement corresponding to a second track within the virtual coordinate system of the ultrasonic sensory field with respect to the stationary origin of the receiver of the navigation system during the second range;
- aligning the second range of the wand second track with a Y principal axis of the device coordinate system;
- mapping both the X principal and Y principal axes of the virtual coordinate system to principal axes of the device coordinate system of the navigation system;
- computationally orienting a pairing of the wand and the receiver in a predetermined configuration along the first track and the second track during the calibrating;
- from the predetermined configuration, calculating phase differences in reported wand orientation and location with respect to the receiver between the virtual coordinate system and device coordinate system;
- calibrating sensor characteristics of the wand and receiver as an approximate function of distance and rotation between the wand and the receiver based on the phase differences; and
- storing tuning parameters associated with the calibrating of sensor characteristics to files for recording precise calibration of transducer characteristics of the pairing of wand and receiver devices.

18. The method of claim 1, further comprising:
- presenting a first visual indicator that calibration is starting;
- evaluating the first and second full range of wand movement within the ultrasonic sensory field;
- mapping the full range of wand movements to a display range of the display coordinate system; and
- presenting a second visual indicator when the mapping is complete, wherein the mapping maps at least two locations of the wand along each of three orthogonal principal axes in the ultrasonic sensory field to corresponding principal axes of the display range to assign a virtual coordinate system to the ultrasonic sensory field.

19. The method of claim 1, wherein mapping the range further comprises:
- estimating an elliptical or approximately spherical trajectory of the virtual coordinate system from a full rotational range of wand movement;
- determining and visually presenting an origin of the virtual coordinate system by finding the stationary origin of the elliptical or approximately spherical trajectory;
- identifying the stationary origin of the wand in the virtual coordinate system from a center of the circumferential boundary;
- determining a difference between the stationary origin of the wand in the virtual coordinate system and a display origin in the display coordinate system; and
- mapping the virtual coordinate system to the display coordinate system based on the difference.

20. The method of claim 1, where the mapping includes:
- translating the circumferential boundary of the elliptical or spherical trajectory to a projection through an affine transformation; and
- non-linearly mapping the projection onto a rectangular area of the display, wherein the mapping accounts for the movement of the wand along the first and second full range of wand movement along the principal axes of the virtual coordinate system with respect to a principal axes of the display coordinate system.

* * * * *